United States Patent [19]

Bussin

[11] Patent Number: 5,485,140
[45] Date of Patent: Jan. 16, 1996

[54] VEHICLE OBSTACLE DETECTOR AND ALARM SYSTEM

[76] Inventor: George N. Bussin, 2934 Tyler Ct., Simi Valley, Calif. 93063

[21] Appl. No.: 264,990

[22] Filed: Jun. 24, 1994

[51] Int. Cl.$^6$ ................................................. B60Q 1/00
[52] U.S. Cl. .................... 340/436; 340/435; 340/437; 340/596; 340/665; 200/61.42; 200/61.44
[58] Field of Search ..................... 340/436, 437, 340/435, 596, 665, 595; 200/61.42, 61.44, 61.41, 61.43; 116/28 A, 28 R; 73/649, 661; 310/311, 334

[56] References Cited

U.S. PATENT DOCUMENTS

| | | | |
|---|---|---|---|
| 4,855,736 | 8/1989 | Hsu | 340/436 |
| 4,870,868 | 10/1989 | Gastgeb et al. | 73/649 |
| 4,967,180 | 10/1990 | Wang | 340/436 |
| 5,293,152 | 3/1994 | Bussin et al. | 340/436 |
| 5,408,214 | 4/1995 | Chalmers et al. | 340/436 |

*Primary Examiner*—Donnie L. Crosland
*Attorney, Agent, or Firm*—Albert O. Cota

[57] ABSTRACT

An improved vehicle obstacle detector and alarm system (10) consisting of an obstacle detector assembly (12) and an electronic control unit (40). The assembly (12) includes an impact probe (14) that is attached through a flexible rod (16) to the front end (18A) of a housing (18). The housing includes at its rear end (18B) an acoustic transducer cavity (18D) into which is inserted a piezoelectric acoustic transducer (26) that is attached to the first end (20A) of a coaxial cable (20). The second end of the cable (20) is attached to an female connector (22) that interfaces with a male connector (41) on the electronics control unit (40). When the impact probe (14) encounters an obstacle, a series of mechanical oscillations are produced that are mechanically transmitted through the flexible rod (16), the housing (18) and ultimately to the piezoelectric acoustic transducer (26). The transducer (26) produces a series of electrical pulses, corresponding to the mechanical oscillations, that are then applied through the cable (20) to the electronics control unit (40). The unit (40) processes the electrical pulses and subsequently provides an alarm signal that energizes an audio and visual alarm that alerts the driver of a motor vehicle when the vehicle has encountered an obstacle.

19 Claims, 5 Drawing Sheets

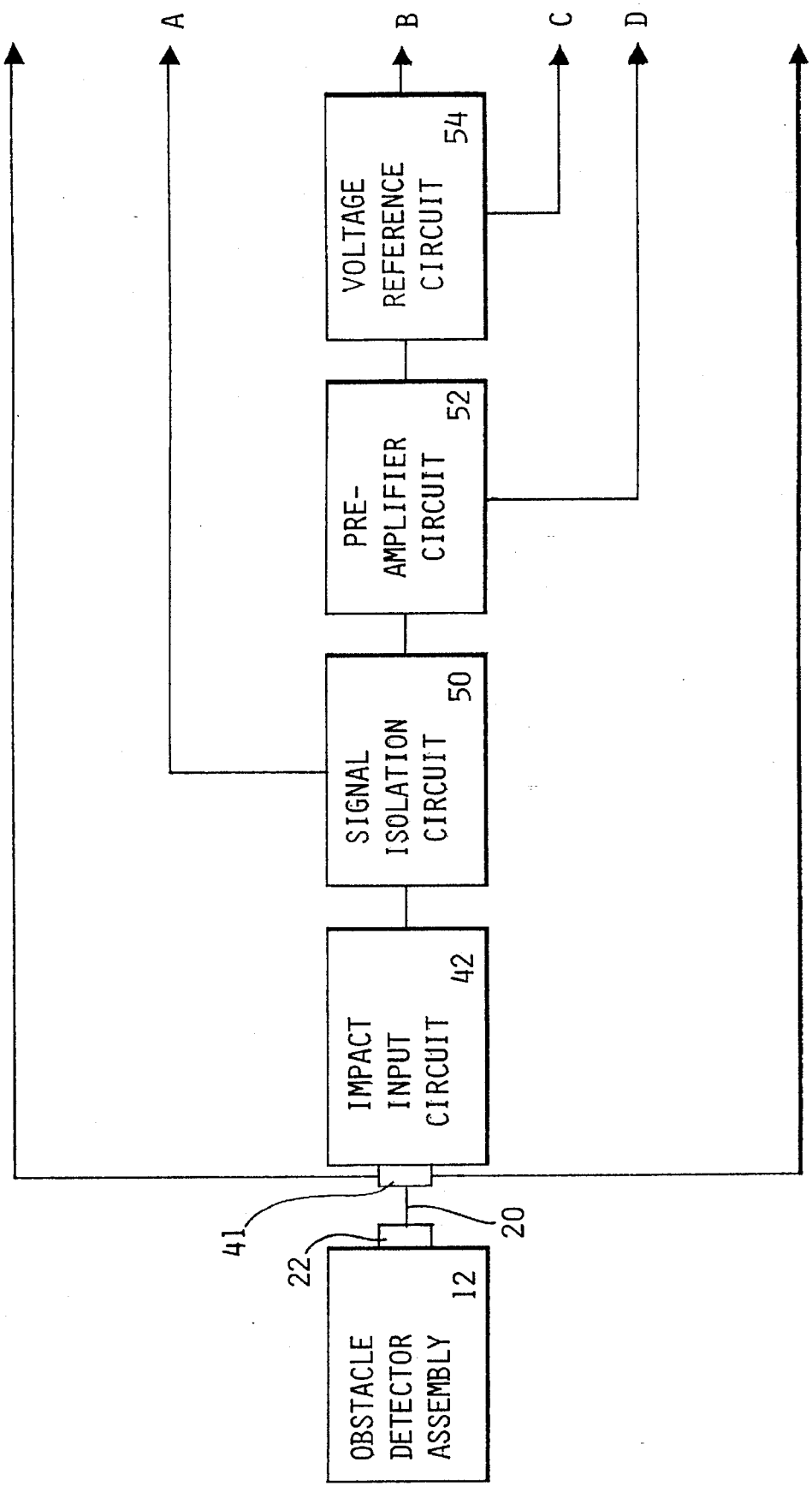

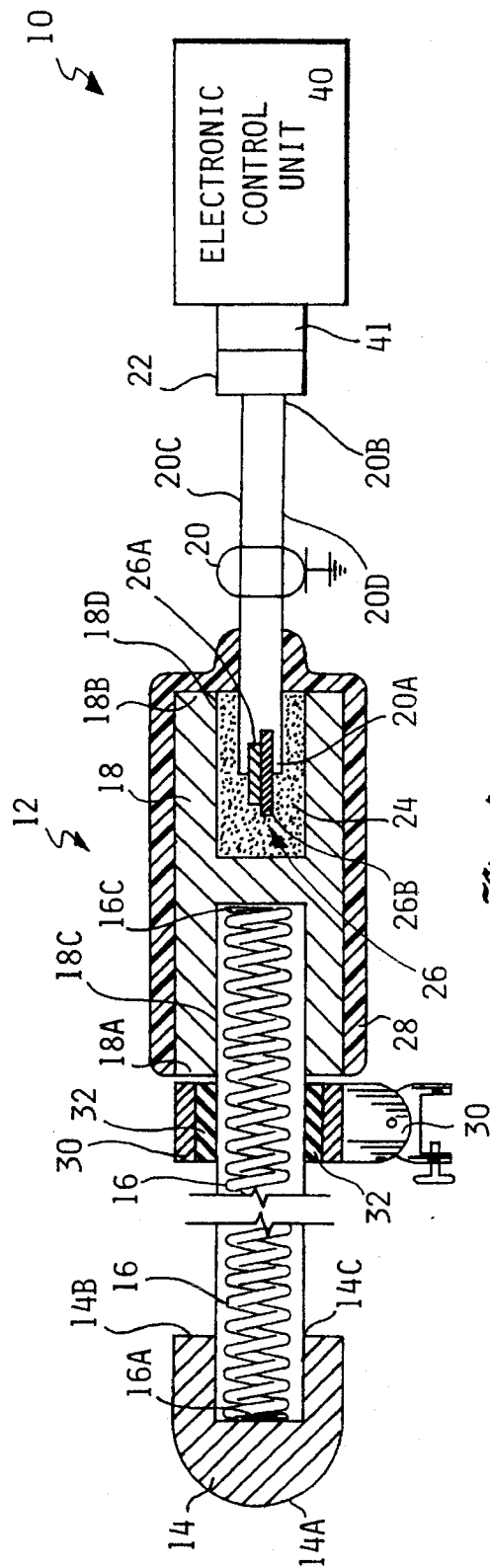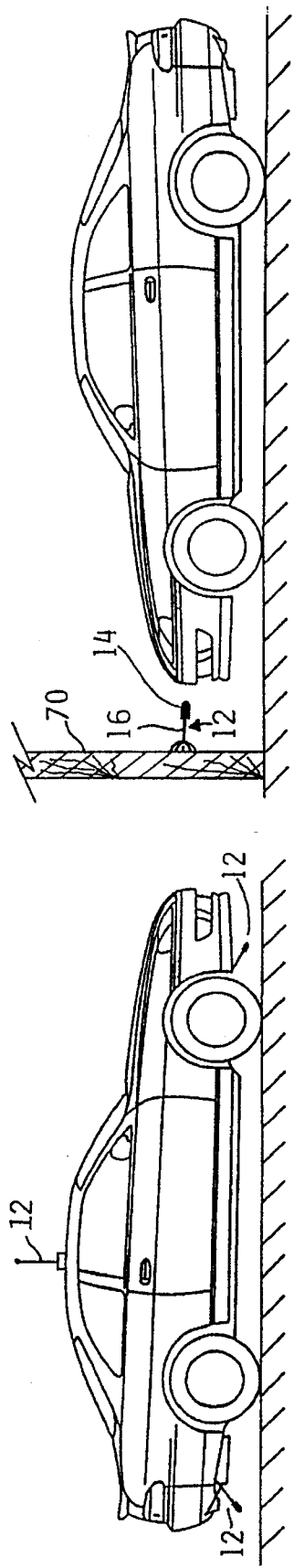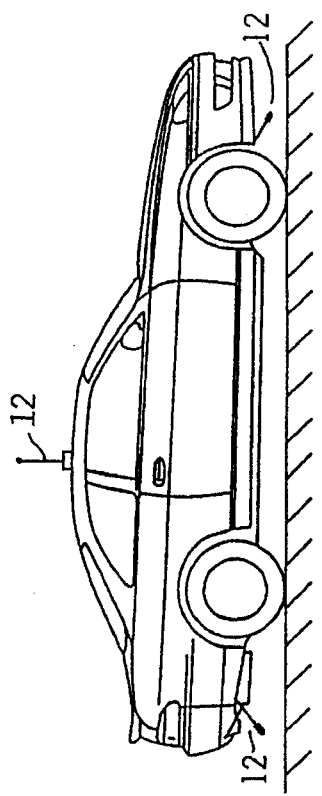

VEHICLE OBSTACLE DETECTOR AND ALARM SYSTEM

TECHNICAL FIELD

The invention pertains to the general field of obstacle detectors and alarm systems more particularly to such a system that functions as an obstacle detector and alarm system for use on various types of motor vehicles.

BACKGROUND ART

Mechanical and electrical vehicle obstacle detectors and particularly curb detectors, have been in use for a long period of time. The curb detectors which are used primarily to facilitate parking a vehicle generally employ a flexible probe that is attached near the front and back wheels of the vehicle. The probes are adjusted to rub against an obstruction, such as a street curb, with a predetermined clearance between the obstruction and the vehicle.

Mechanical curb detectors alert a driver that an obstacle has been reached when a rubbing noise, made by the curb detector, is heard by the driver by mechanical transmission. When electrical/electronic detectors are used, an electrical signal is produced when the curb detector strikes or scrapes against an obstacle such as a curb. The generated signal operates a lamp and/or a buzzer located in the vehicle's driving compartment to alert the driver that an obstacle has been encountered.

A search of the prior art did not disclose any patents that read directly on the claims of the instant invention. However, the following U.S. patents were considered related:

| U.S. PAT. NO. | INVENTOR | ISSUED |
| --- | --- | --- |
| 5,293,152 | Bussin et al | 8 March 1994 |
| 4,967,180 | Wang | 30 October 1990 |
| 4,904,894 | Henry | |
| 4,870,868 | Gastgeb | 3 October 1989 |
| 4,855,736 | Hsu | 8 August 1989 |

U.S. Pat. No. 5,293,152 Bussin et al patent discloses a vehicle obstacle detector and alarm system that alerts the driver of a motor vehicle when the vehicle encounters an obstacle. The system consists of an obstacle detector assembly that includes a front probe that houses a piezoelectric element and that is attached to the curb side of a vehicle. When the probe scrapes against an obstacle, it produces electrical oscillations. The oscillations are applied to an electronics control unit that subsequently produces an alarm signal that energizes a visual and/or audio alarm located in the cab of the vehicle.

George N. Bussin, one of the patentees of this patent, is also the applicant of the instant application which improves upon the patent. The improvement is applicable to both the obstacle detector assembly and the electronics control unit as described herein.

The U.S. Pat. No. 4,967,180 Wang patent discloses a pre-impact alarm apparatus that signals the driver of a motor vehicle that obstacles exist in the path of the vehicle when the vehicle is backing-up. The alarm apparatus consists of a flexible sensing bar that projects from the rear of the vehicle. The bar includes an electrical impact head that is electrically attached to a buzzer located within the vehicle. When the sensing bar impacts an obstacle, the impact head closes a set of contacts that energizes the buzzer.

The U.S. Pat. No. 4,904,894 Henry patent discloses a hail sensor that uses a plurality of piezoelectric transducer positioned to produce an output signal when it is vibrated by a hailstone. The transducer output is supplied to a conventional signal processing circuit such as peak detectors and counters, which detect the electrical signal produced by the transducers.

The U.S. Pat. No. 4,870,868 Gastgeb patent discloses a sensing device which produces a response when the point of impact between an object and a member occurs at a preselected location on the member. The sensing apparatus includes a piezoelectric sensor that produces an oscillatory electrical signal which is proportional to the vibration in the member generated by the collision between the object and the member. Appropriate circuitry is provided for analyzing the oscillatory electrical signal and for producing a response if the object impacted the member at a preselected location.

The U.S. Pat. No. 4,855,736 Hsu patent discloses an electronic parking sensor apparatus having a base for attaching to a vehicle. The apparatus includes a flexible probe for contacting an impending obstacle. The probe is electrically attached to an electronics alarm unit that includes a filter circuit, an alarm circuit and is equipped with a pair of 1.5 volt cells that supplies the power to the alarm unit. The filter includes a timer for activating the alarm circuit when the electrical signal continues beyond a first interval which varies between 0.05 to 1.0 seconds. The timer also prevents activation of the alarm unit beyond a second longer interval that varies between 10 to 40 seconds. Separate front and rear transmitter units can operate on different signal frequencies for separately indicating front and rear contact with the obstruction.

For background purposes and as indicative of the art to which the invention is related, reference may be made to the following remaining patents found in the search.

| U.S. PAT. NO. | INVENTOR | ISSUED |
| --- | --- | --- |
| 4,585,898 | Beer | 15 July 1986 |
| 4,519,245 | Evans | 28 May 1985 |
| 4,488,873 | Bloomfield et al | 18 December 1984 |

DISCLOSURE OF THE INVENTION

The improved vehicle obstacle detector and alarm system is designed to alert the drive of a motor vehicle, such as an automobile, truck, recreational vehicle or boat, that the vehicle has encountered an obstacle. When alerted, the driver, can take evasive action to minimize and/or prevent further impact. The system consists of two major elements: an obstacle detector assembly and an electronics control unit.

The obstacle detector assembly consists of a metal impact probe that is attached to the front end of a flexible rod that is preferably constructed of a tightly wound spring. The back end of the rod is frictionally inserted into a longitudinal rod cavity located on the front end of a metal housing which also includes at its back end a longitudinal acoustic transducer cavity. Into the transducer cavity is inserted and potted a piezoelectric acoustic transducer that is attached to the first end of a coaxial cable.

The second end of the coaxial cable is connected to a female connector that interfaces with a male connector attached to the electronics control unit. To add structural integrity and minimize moisture penetration, a resilient cover, such as heat shrinkable tubing, is placed over the outside of the housing and the section of cable extending near the rear end of the housing. The entire obstacle detector assembly is then removably clamped to a vehicle structure so that the impact probe attached to the front of the flexible rod is positioned to be at the same level as a street curb.

The electronics control unit is housed within an enclosure located within the vehicle cab and is comprised of the following circuits: an impact input circuit, a power input circuit, a voltage protection circuit, a voltage regulator circuit, a signal isolation circuit, a preamplifier circuit, a voltage reference circuit, a window comparator circuit, a detector circuit, a level comparator circuit and an alarm circuit.

The impact input circuit initially receives the electrical pulses from the piezoelectric acoustic transducer attached to the coaxial cable. From the input circuit the pulses are applied to the signal isolation circuit that produces a pulse output signal that is maintained at an optimum level. The signal isolation circuit is also applied a power input that powers the circuits of the electrical control unit. The power is derived from a 12-volt d-c vehicle battery and is applied successively through the power input circuit; the voltage protection circuit that filters the voltage and that protects the circuits from an over voltage and reverse installation; and the voltage regulator circuit which produces the final regulated d-c voltage that powers the unit.

Across the signal isolation circuit, is also connected the voltage reference circuit that establishes a high, middle and low reference voltage. From the signal isolation circuit, the electrical pulses are amplified through the preamplifier circuit and the amplified signal is applied to the window comparator circuit. The window comparator circuit determines if the amplified signal is above the high reference voltage, at the middle reference voltage or below the low reference voltage. The high and low reference voltages set the top and bottom levels for the window comparator. The middle reference voltage sets the bias voltage for the preamplifier circuit. When the threshold voltage level of the window comparator is exceeded, a pulse signal is produced that signifies that the probe has made contact with an obstacle.

The pulse signal from the window comparator is applied to the detector circuit that lengthens the pulse to produce an audible tone that is then applied to the level comparator. The level comparator produces an alarm signal that is used to energize the alarm circuit. The alarm circuit includes both an audible alarm and a visual alarm that are both energized by the alarm signal which then alerts the vehicle driver that the vehicle has encountered an obstacle.

In view of the above disclosure, it is the primary object of the invention to produce an improved obstacle detector and alarm system that easily attaches to a vehicle and that provides a vehicle driver with both an audible and visual alarm when the vehicle has encounterd an obstacle that is to the side, front, back or top of the vehicle.

In addition to the primary object it is also an object of the invention to provide an improved obstacle detector and alarm system that:

can be used in both dry and inclement weather, uses an impact probe that is omnidirectional and that produces an oscillating mechanical signal when the probe touches or scrapes against an obstacle, can be attached to the wall of a building structure, can be manufactured with selectable flexible rod lengths, is adaptable for use on recreational vehicles, power boats and sailing boats, is reliable with no or very little maintenance, and is cost-effective from both a consumer and manufacturers point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIGS. 1A and 1B are block diagrams of the improved vehicle detector and alarm system.

FIG. 2 is a side elevational view of a vehicle having an obstacle detector assembly attached to its lower rear side and lower front side.

FIG. 3 is a side elevational view of an obstacle detector and alarm system mounted to a wall of a structure with the obstacle detector assembly positioned to encounter the front section.

FIG. 4 is a side sectional view of the obstacle detector assembly attached to an electronic control unit.

BEST MODE FOR CARRYING OUT THE INVENTION

Figure 1B:
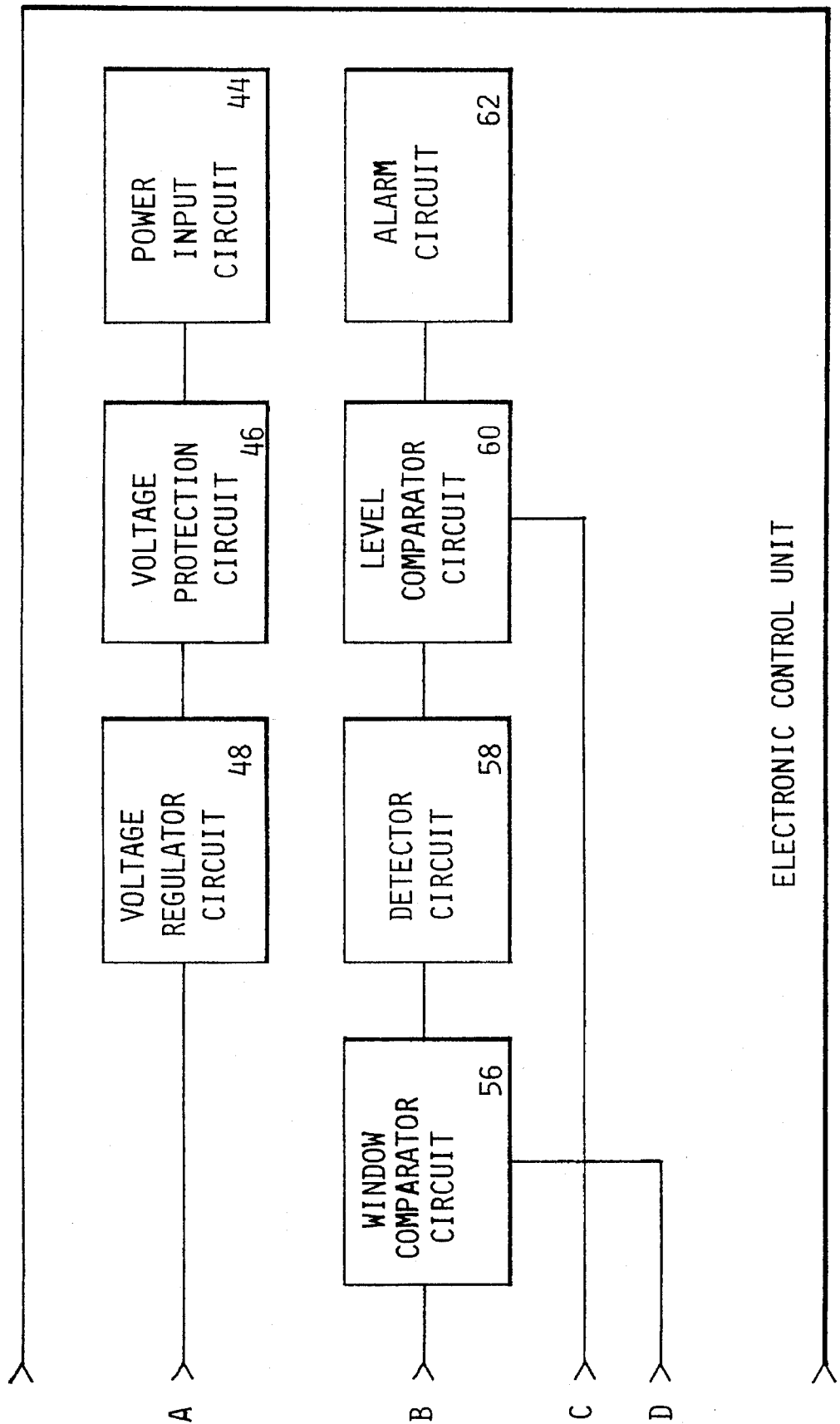

The best mode for carrying out the invention is presented in terms of a preferred embodiment that is designed to alert a driver of a vehicle, by means of an alarm, when the vehicle has encountered an obstacle.

The preferred embodiment of the improved vehicle obstacle detector and alarm system 10 as shown in FIGS. 1–5 is comprised of two major elements: an obstacle detector assembly 12 and an electronics control unit 40. At least on obstacle detector assembly 12 is adjustably mounted by means of a clamp or the like to the top or near the front and/or back curb side of a motor vehicle with the unit 40 located within the cab of the vehicle. The assembly 12 when mounted to an automobile, is mounted in a plane that allows it to touch or scrape against a street curb as shown in FIG. 2. The assembly 12 can also be mounted and positioned on the roof of a recreational vehicle ahead and/or behind a roof elevated item such as an air conditioner. Thus, a driver can be alerted when a low underpass has been encountered. Alternatively, the obstacle detector assembly 12 and the electronics control unit 40 can be mounted to a wall of a structure 70 with the assembly 12 elevated to encounter the front or back of a vehicle as shown in FIG. 3. In this mounting arrangement, a separate 12-volt d-c power supply is required and the alarm circuit 62 can be made and mounted as a separate unit or remain as an integral element of the electronics control unit 40.

The obstacle detector assembly 12 which is shown in block form in FIG. 1 and in a sectional cutaway in FIG. 4, is comprised of an impact probe 14, a flexible rod 16, a housing 18, a coaxial cable 20, a female connector 22, a potting compound 24, a piezoelectric acoustic transducer 267, a resilient cover 28 and a clamp assembly 30.

The impact probe 14 which forms the forward end of the assembly 12 is preferably made of stainless steel, has a rounded front end 14A, a rear end 14B and a first rod cavity 14C that extends longitudinally from the rear end 14B. The cavity 14C is sized to frictionally receive a front section 16A of the flexible rod 16 as shown in FIG. 4. The rod 16 includes a rear section 16B and is constructed of a tightly wound spring 16O. Although a spring construction is preferred, the rod 16 can also be constructed of a solid metal (not shown).

The housing 18 as also shown in FIG. 4, is constructed of a metal and includes a front end 18A and a rear end 18B. Extending longitudinally from the front end 18A is a second rod cavity 18O and extending longitudinally from the rear end is an acoustic transducer cavity 18D. Into the second rod cavity 18C is frictionally inserted and held therein, the rear section 16B of the flexible rod 16.

The cable 20 which connects the assembly 12 to the electronic control unit 40, is preferably comprised of a coaxial cable having a first end 20A and a second end 20B. The coaxial cable has a center conductor designated the first conductor 20C and a cable shield designated the second conductor 20D. The first conductor 20C and second conductor 20D projecting from the second end 20B, as shown in FIG. 4 are connected to the female connector 22 where the second conductor 20D is attached to common ground. To the first end 20A of the cable 20 is attached an acoustic transducer 26.

The transducer 26 is preferably a piezoelectric acoustic transducer 26 of the type having a piezoelectric ceramic element, designated the first electrode 26A, bonded to a metal plate, designated the second electrode 26B. The piezoelectric transducer has an overall thickness ranging from 0.2 to 0.6 mm, and produces no-noise due to non-contact. As shown in FIG. 4, the first electrode 26A is attached to the first conductor 20C projecting from the first end 20A of the cable 20; likewise, the second electrode 26B is attached to the second conductor 20D.

The attached piezoelectric acoustic transducer 26 is inserted into the acoustic transducer cavity 18D on the housing 18 and held therein by the insertion, into the cavity 18D, of a potting compound 24. After the transducer 26 is potted, a resilient cover 28, such as heat shrinkable tubing, is placed over the outside surfaces of the housing 18 and the section of the cable 20 that extends near the end of the housing 18 and the section of the cable 20 that extends near the end of the housing 18 as shown in FIG. 4.

As also shown in FIG. 4, a means for attaching the obstacle detector assembly 12 to a vehicle structure is provided. This means preferably consists of first placing a sleeve 30, made of a resilient material, such as rubber, over the flexible rod 16 near the front end 18A of the housing 18. The sleeve functions as a shock absorber for a clamp assembly 32 that is placed over the sleeve 30. The clamp includes an outward projecting section having means for being attached to the vehicle structure.

When the impact probe 14 touches or scrapes against an obstacle, mechanical oscillations are produced by the impact probe 14 that travel through the flexible rod 16 into the housing 18. From the housing 18, the oscillations are mechanically transmitted through the potting compound 24 to the piezoelectric acoustic transducer 26. The transducer produces a series of electrical pulses that correspond to the mechanical oscillations, which are applied through the female connector 22 attached to the second end 20B of the cable 20, and into the electronic control unit 40.

Figure 5A:
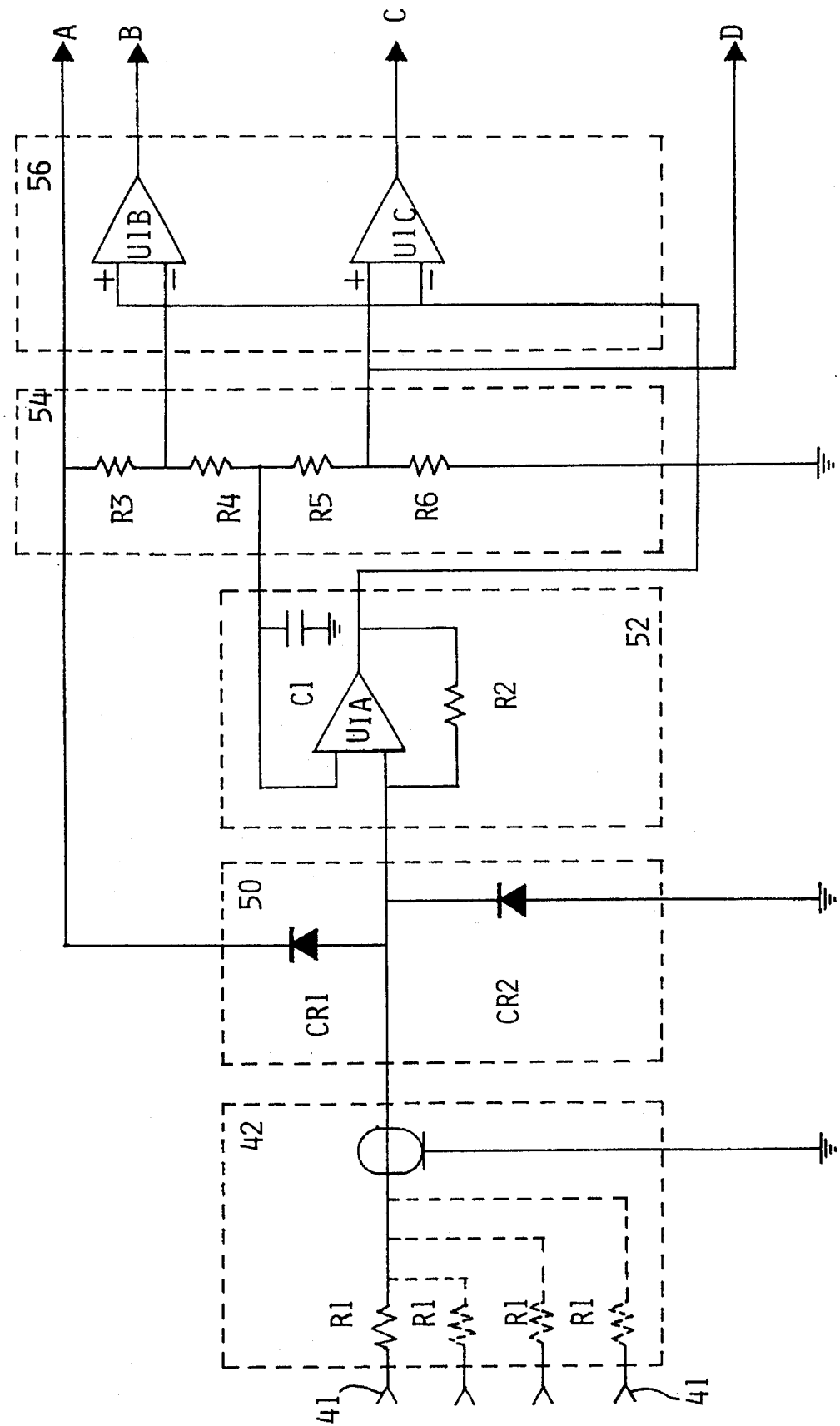
FIGS. 5A and 5B are schematic diagrams of the improved obstacle detector and alarm system.
Figure 5B:
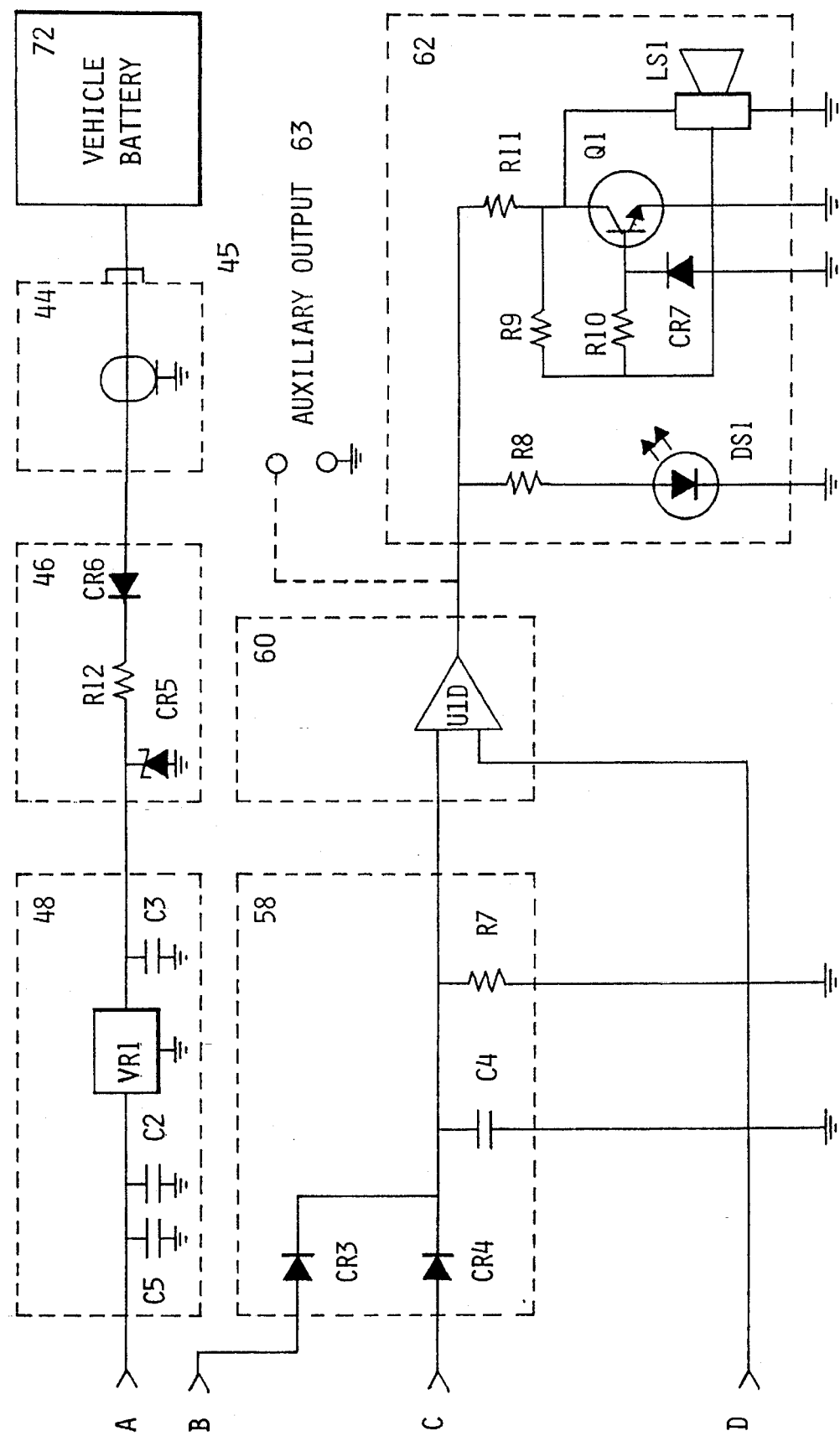

The electronic control unit 40 is shown in block form in FIGS. 1A and 1B and schematically in FIGS. 5A and 5B. The unit 40 is housed within an enclosure that has attached at least one and preferably four male connectors 41 that mate with the female connector 22. The unit 40 includes circuit means for receiving and processing the electrical pulses from the piezoelectric acoustic transducer 26 and subsequently producing an alarm that alerts a driver that his or her vehicle has encountered an obstacle. The unit 40 is comprised of an impact input circuit 42, a power input circuit 44, a voltage protection circuit 46, a voltage regulator circuit 48, a signal isolation circuit 50, a preamplifier circuit 52, a voltage reference circuit 54, a window comparator circuit 56, a detector circuit 58, a level comparator circuit 60 and an alarm circuit 62.

The impact input circuit 42 functions as the input to the electronic control unit 40. The circuit 42, as shown in FIGS. 1A and 5A includes at least one male coaxial connector 41 that receives the electrical pulses produced by the obstacle detector assembly 12 through resistor R1 via the female coaxial connector 22 attached to the coaxial cable 20. As shown by the dashed lines in FIG. 5A, additional inputs which require a resistor R1 can be added as required.

The power input circuit 44 as shown in FIGS. 1B and 5B consists of a power input connector 45 that is applied 12-volts d-c from the vehicle battery 72. The battery voltage is applied through a voltage protection circuit 46 that filters the voltage through diode CR6, resistor R12 and zener diode CR5. From the circuit 44, which also protects the circuits of the electronic control unit 40 from over voltages and reverse installations, the power is applied through a voltage regulator circuit 48. The circuit 48 filters the d-c voltage and produces a regulated d-c voltage that is applied to the signal isolation circuit 50 and to a voltage reference circuit 54. The circuit 54 is connected across the circuit 50 and consists of a voltage divider network further consisting of resistor R3 through R6 that establish high, middle and low reference voltages. The regulated d-c voltage from the voltage regulator circuit 48 is applied to the signal isolation circuit 50 via diode CR1, as shown in FIG. 5A.

The circuit 50 which also receives the electrical pulses from the impact input circuit 42 produces a pulse output signal that is applied to an integrated circuit U1A and resistor R2 located in the preamplifier circuit 52. The combination of U1A, R1 and R2 forms an inverting amplifier with a voltage gain which is determined by dividing resistor R2 by resistor R1. The amplified signal from the circuit 52 is applied to integrated circuits U1B and U1C in the window comparator circuit 56. The circuit 56 determines if the applied signal is above the high reference voltage, at the middle reference voltage, or below the low reference voltage established by the voltage reference circuit 54. The high and low reference voltages provided from the junction of resistors R3 and R4 and from the junction of resistors R5 and R6 respectively, set the top and bottom levels for the inputs to integrated circuits U1B and U1C respectively. The middle reference voltage provided from the junction of resistor R4 and R6, is used to set the bias voltage for circuit U1A in the preamplifier circuit 52 which is required to reference the input signal to the middle of the available power supply voltage. When the threshold level of the window comparator circuit 56 is exceeded, a pulse signal is produced which signifies that the impact probe 14 has encountered an obstacle.

The pulse signal from the window comparator 56 is applied through diodes CR3 and CR4 located in the detector circuit 58, and supplies capacitor C4 with a charge. Capacitor C4 and resistor R7 function as a time delay circuit. The circuit takes a short pulse form the window comparator circuit 56 and allows the pulse to be lengthened so that an audible tone signal is produced that is then applied to integrated circuit U1D in the level comparator circuit 60. The circuit U1D produces an alarm drive signal when the audible tone signal is above the low reference voltage level set by the voltage reference circuit 54.

The alarm drive signal from the level comparator circuit is applied to an alarm circuit 62 that consists of an audio transducer LS1 and an illuminating device D51 that alert the driver of a vehicle that the vehicle has encountered an obstacle. One type of audio transducer that may be used in the assembly 10 is a piezoelectric buzzer unit that produces a buzzing sound when the impact probe 14 encounters an obstacle. A typical alarm circuit that uses a buzzer unit is shown in FIG. 5B. In this circuit the buzzer is energized by an alarm drive signal that is produced by a self-oscillating circuit that is recommended by the buzzer manufacturer.

In lieu of a buzzer, the alarm circuit 62 may employ a circuit that drives a ceramic resonator that produces a constant audible sound when the alarm drive signal is applied. The circuit that drives the ceramic resonator may also include an oscillating circuit means that allows the resonator to produce a varying-pitch audio tone. Additionally, an audio circuit that allows an audio transducer to produce a bell-like audio tone can also be used. Also, in lieu of an internal illuminating device DS1, the visual alarm indicator may consist of an existing automobile panel lamp such as a hazard lamp. In this design, the hazard lamp would be activated by a power signal from integrated circuit U1D located in the level comparator circuit 60.

While the invention has been described in complete detail and pictorially shown in the accompanying drawings, it is not to be limited to such details, since many changes and modifications may be made to the invention without departing from the spirit and the scope thereof. For example, an auxiliary output 63 as shown in FIG. 5B can be designed into the system 10. This output could be used to provide the power to operate as a limit switch as would typically be used in a conveyor belt system. In this application, the device would detect an off-side, shifted load and shut-down the system before the shifted load causes a problem. Hence, it is described to cover any and all modifications and forms which may come within the language and scope of the claims.

I claim:

1. An improved obstacle detector and alarm system comprising:
    a) at least one obstacle detector assembly comprising:
        (1) an impact probe having a front end, a rear end, and having a first rod cavity that extends longitudinally from the rear end,
        (2) a flexible rod having a front section and a rear section, where the front section is sized to be frictionally inserted into and held within the first rod cavity,
        (3) a housing having a front end, a rear end, and having a second rod cavity that extends longitudinally from the front end, and an acoustic transducer cavity that extends longitudinally from the rear end, where into the second rod cavity is frictionally inserted and held therein the rear section of said flexible rod,
        (4) a cable having a first end and a second end with the cable encompassing a first conductor and a second conductor, where the first and second conductors projecting from the second end are connected to a female connector with the second conductor connected to common ground,
        (5) an acoustic transducer having a first electrode and a second electrode, where the first electrode is attached to the first conductor projecting from the first end of said cable, and the second electrode is attached to the second conductor projecting from the first end of said cable, where the attached acoustic transducer is inserted into the acoustic transducer cavity on said housing and is held therein by the insertion of a potting compound, where when said impact probe touches or scrapes against an obstacle, mehcanical oscillations are produced by said impact probe that travel through said flexible rod into said housing, from said housing the oscillations are mechanically transmitted through the potting compound to said acoustic transducer from where a series of electrical pulses are produced and applied through the female connector attached to said cable, and
    b) an electronic control unit housed within an enclosure having attached at least one male connector that mates with the female connector on said cable, and having circuit means for processing the electrical pulses and subsequently producing an alarm that alerts a driver of a vehicle when the vehicle has encountered an obstacle.

2. The system as specified in claim 1 wherein said impact probe is constructed of stainless steel.

3. The system as specified in claim 2 wherein said impact probe has a rounded front end.

4. The system as specified in claim 1 wherein said flexible rod is constructed of a tightly wound spring.

5. The system as specified in claim 1 wherein said flexible rod is constructed of a solid metal.

6. The system as specified in claim 1 wherein said housing is constructed of a metal.

7. The system as specified in claim 1 wherein said cable is comprised of a coaxial cable where the center conductor of the coaxial cable is designated the first conductor and the coaxial cable shield is designated the second conductor.

8. The system as specified in claim 1 wherein said acoustic transducer is comprised of a piezoelectric acoustic transducer.

9. The system as specified in claim 1 further comprising a resilient cover that is placed over the outside surfaces of said housing and the section of said cable that extends near the rear end of said housing.

10. The system as specified in claim 9 wherein said resilient cover is comprised of heat shrinkable tubing.

11. The system as specified in claim 1 further comprising a means for attaching said obstacle detector assembly to a vehicle structure.

12. The system as specified in claim 11 wherein said means for attaching said obstacle detector assembly to a vehicle structure comprises:
    a) a resilient sleeve placed over the flexible rod near the front end of said housing, and
    b) a clamp assembly placed over said rubber sleeve, with said clamp having an outward projecting section housing means for being attached to the vehicle structure.

13. The system as specified in claim 1 wherein said electronic control unit circuit means comprises:
    a) an impact input circuit having at least one male connector that receives the electrical pulses applied from the female connector on said cable attached to said obstacle detector assembly,
    b) a power input circuit having a connector that is applied a 12-volt d-c supplied by a vehicle battery, where the voltage is applied through a voltage protection circuit that filters the voltage and that protects the circuits of said electronic control unit from an over voltage and reverse installations, c) a voltage regulator circuit which receives the filtered 12-volt d-c voltage from said voltage protection circuit and thereafter produces a regulated d-c voltage, d) a signal isolation circuit that receives the electrical pulses from said impact input circuit and the regulated d-c voltage from said voltage regulator circuit, where said signal isolation circuit produces a pulse output signal, e) a preamplifier circuit that receives and amplifies the pulse output signal from said signal isolation circuit and that in combination with said signal isolation circuit sets the voltage gain of said preamplifier circuit, f) a voltage reference circuit connected across said signal isolation circuit, where said voltage reference circuit establishes:
  (1) a high reference voltage,
  (2) a middle reference voltage, and
  (3) a low reference voltage, g) a window comparator circuit that determines if the amplified signal from said preamplifier is above the high reference voltage, at the middle reference voltage or below the low reference voltage as established by said voltage reference circuit, where the high and low reference voltages set the top and bottom levels for said window comparator circuit and the middle reference voltage sets the bias voltage for said preamplifier circuit, where when the threshold voltage level of said window comparator circuit is exceeded, a pulse signal is produced that signifies that said impact probe has encountered an obstacle, h) a detector circuit that receives and lengthens the pulse signal received from said window comparator so that an audible tone is produced, i) a level comparator circuit that receives the lengthened pulse from said detector circuit and thereafter produces an alarm drive signal when the level of the lengthened pulse is above the low reference voltage level set by said voltage reference circuit, and j) an alarm circuit comprising:
  (1) an audio transducer, and
  (2) an illuminating device, where when the alarm drive signal is applied to said alarm circuit, the audio transducer and/or the illuminating device are energized to produce an audible tone and light respectively that alerts the driver of a vehicle that the vehicle has encountered an obstacle.

14. The system as specified in claim 13 wherein said audio transducer is comprised of a piezoelectric buzzer unit that produces a buzzing sound.

15. The system as specified in claim 13 wherein said audio transducer is comprised of a ceramic resonator that produces a constant audible sound.

16. The system as specified in claim 15 wherein said alarm circuit is further comprised of an oscillating circuit means that allows the ceramic resonator, to produce a varying-pitch audio tone.

17. The system as specified in claim 13 wherein said alarm circuit further comprises an audio circuit means that allows the audio transducer to produce a bell-like audio tone.

18. The system as specified in claim 13 wherein said illuminating device is comprised of a light emitting diode.

19. The system as specified in claim 1 wherein said obstacle detector assembly can be attached and positioned to either the front, back, sides or the roof of a motor vehicle.

* * * * *